Figure 1:
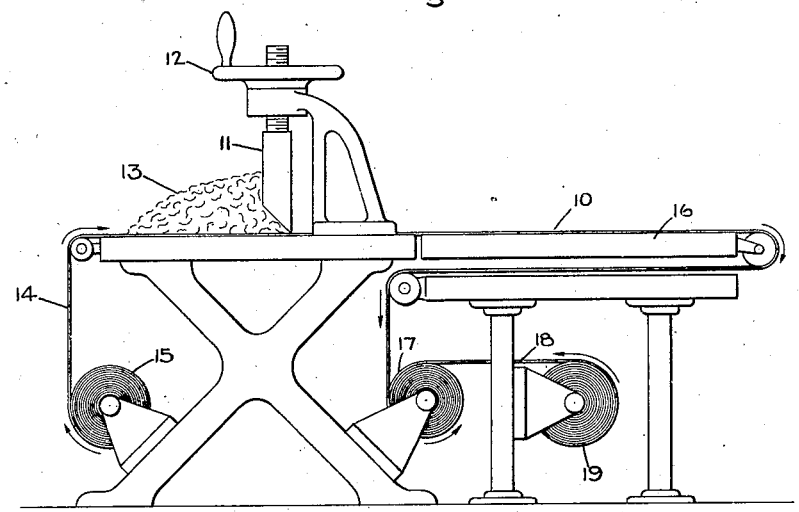

May 30, 1939.  M. M. SAFFORD  2,160,230
RESINOUS COMPOSITION AND METHOD FOR PREPARING SAME
Filed Oct. 25, 1935  2 Sheets-Sheet 1

Inventor:
Moyer M. Safford,
by Harry E. Dunham
His Attorney.

May 30, 1939. M. M. SAFFORD 2,160,230
RESINOUS COMPOSITION AND METHOD FOR PREPARING SAME
Filed Oct. 25, 1935   2 Sheets-Sheet 2

Inventor:
Moyer M. Safford,
by Harry E. Dunham
His Attorney.

Patented May 30, 1939

2,160,230

UNITED STATES PATENT OFFICE 2,160,230

RESINOUS COMPOSITION AND METHOD FOR PREPARING SAME

Moyer M. Safford, Schenectady, N. Y., assignor to General Electric Company, a corporation of New York Application October 25, 1935, Serial No. 46,686

4 Claims. (Cl. 260—42)

The present invention relates to new and useful resinous compositions and to methods of preparing the same. More specifically, the invention relates to resinous compositions comprising alkyd resins which compositions possess valuable properties, generally, and which have particularly useful applications in the printing field.

In accordance with my invention I have discovered that alkyd resins are compatible with compounds which are, generally speaking, plastic polymers of chloroprene and that compositions prepared from these ingredients are chemically resistant to such materials as oils, hydrocarbon solvents and printing inks. In addition, such compositions may be prepared so as to possess the properties of resiliency and flexibility of ordinary rubber. The compositions can be compounded in accordance with standard rubber practice and lend themselves to practical use as rubber substitutes.

The term "chloroprene" as used herein designates the chemical compound chloro-2-butadiene 1,3. The latter may be prepared, for instance, from monovinyl acetylene and hydrochloric acid. Upon subjection to ultra-violet light, plastic polymers of chloroprene are produced. Such polymers are obtainable on the market under the trade-name "Duprene" and may be compounded with various organic and inorganic modifying agents as hereinafter more fully described.

Alkyd resins, as is well known, comprise those complexes resulting from the interaction of a polyhydric alcohol, such as glycerine, and a polybasic acid, such as phthalic acid or its anhydride, with or without other reacting ingredients. The term "alkyd resin", as used herein includes the resinous condensation product resulting from the reaction of one or more polyhydric alcohols, one or more polybasic acids with or without one or more of the following ingredients: drying oils, semi-drying oils, non-drying oils, the acids derived from such oils, especially the acids derived from drying oils, with or without other ingredients such as natural resins or other synthetic resins.

In the following specification the term "alkyd resin-polychloroprene compositions" is used to designate the various compositions containing alkyd resin and plastic polymers of chloroprene.

In order that the invention may be understood and practiced by those skilled in the art to which it pertains, the following detailed description is given and its scope pointed out in the appended claims. The preparation of the resinous compositions is first described and then followed by illustration of some of the practical applications of such compositions.

Figure 2:
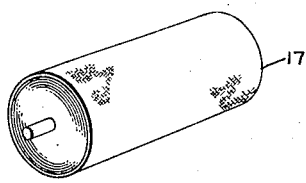
Figure 3:
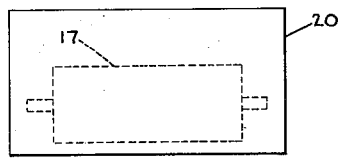
Figure 4:
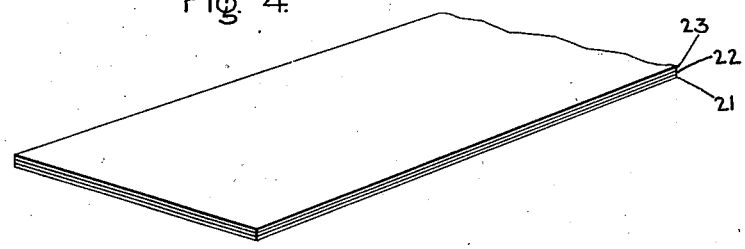
Figure 5:
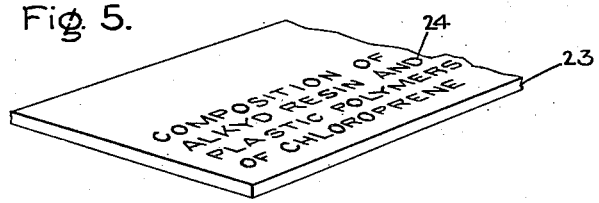
Figure 6:
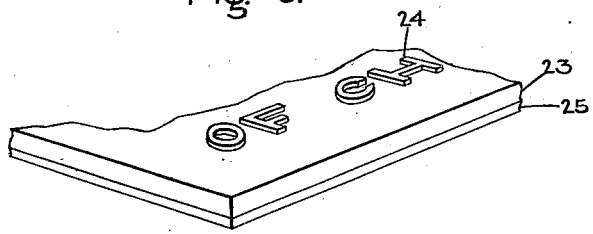
Figure 7:
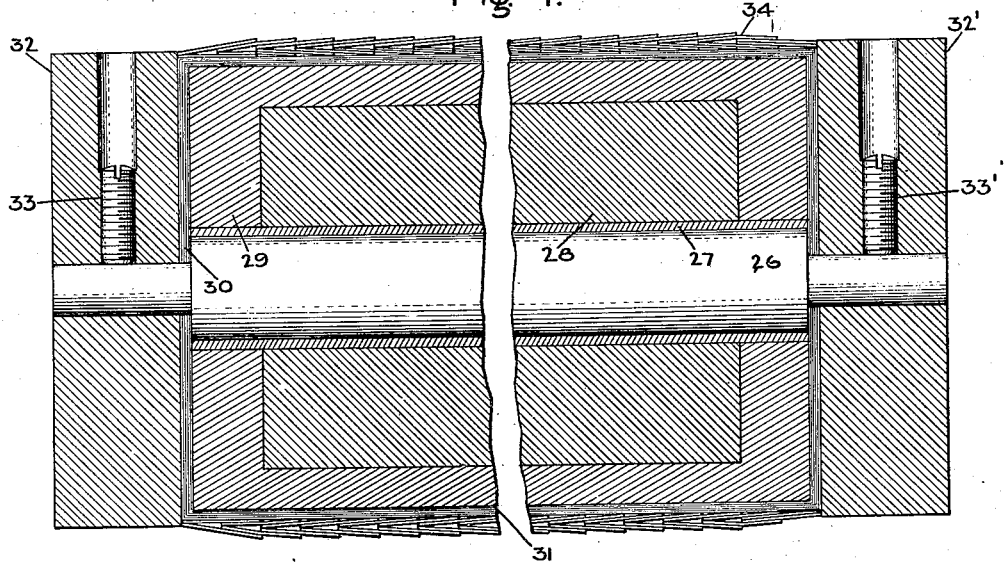

In the accompanying drawings forming a part of the present application, Fig. 1 represents a side elevational view of apparatus for making printers' blankets embodying the compositions of my invention; Fig. 2 is a view in perspective showing a roll of printer's blanket; Fig. 3 is a diagrammatic view of an oven containing a roll of printer's blanket ready for curing; Fig. 4 is a perspective view of a portion of a finished printer's blanket embodying my invention; Fig. 5 is a perspective view of an embossed printer's matrix embodying the compositions of my invention; Fig. 6 is an enlarged portion of a printer's matrix and Fig. 7 is a view in side elevation and partly in section, of a printer's roll with a curing wrapping and end mold therefor.

Referring more specifically to the preparation of the alkyd resin-polychloroprene compositions, one method of preparing the same is as follows:

Method I

A cured (C-stage) alkyd resin is milled on rubber mixing rolls with a compound containing plastic polymers of chloroprene. The alkyd resin-polychloroprene composition is next treated with a liquid such as benzol, carbon tetrachloride and the like which swells the chloroprene polymers. The swollen chloroprene polymers act like vehicle of a paint and the alkyd resin acts like a pigment in a paint. The mass is thoroughly dispersed by appropriate mixing and is ready for use, for example, on a standard spreading machine.

Another method of preparing an alkyd resin-polychloroprene composition is:

Method II

A cured (C-stage) alkyd resin is first passed continuously through ordinary type rubber mixing rolls which are set together and which are cold. The resin is milled until it can be taken off the fast roll in a good strong sheet (strong enough to support its own weight when pulled from the roll horizontally for a distance of approximately one foot). It should not stick to the slow roll. The resin is then taken from the rolls.

The compound containing plastic polymers of chloroprene is then mixed on the rolls until thoroughly broken down after which the milled alkyd resin is slowly added thereto. When it has all been added the composition is milled for sufficient time to insure a uniform mass. Usually, a period of twenty minutes will be sufficient but this may vary depending on the quantity of material being milled and the size of the mill.

Regardless of which method is employed, any proportion of alkyd resin and chloroprene polymers may be taken, the specific proportions chosen being dependent on the nature of the final product desired and the use to which it is to be put.

The alkyd resin-polychloroprene compositions may be cured in dry heat in an air-ventilated oven at an elevated temperature, for example, at 150° C. for a period of time dependent on the composition used and on the thickness of the mass. For example, a ¼" slab of material will require from about 1 to 5 hours at the above temperature for cure. The correct time of cure can easily be determined by experiment in each case.

By way of illustration several examples follow giving various specific combinations which have been found useful.

Example 1

| | Per cent by weight |
|---|---|
| Compound containing plastic polymers of chloroprene | 15 |
| Benzol | 24 |
| Alkyd resin | 61 |

The compound containing plastic polymers of chloroprene may consist of the following ingredients:

| | Per cent by weight |
|---|---|
| Plastic polymers of chloroprene | 72.5 |
| Litharge | 14.5 |
| Sulphur | 0.7 |
| Rosin | 3.6 |
| Anti-oxidant (Neozone D) | 1.4 |
| Zinc oxide | 7.3 |

The alkyd resin which is carried to the C-stage may be prepared from the following ingredients in a manner well-known in the art and described in detail hereafter:

| | Per cent by weight |
|---|---|
| Glycerine | 13.6 |
| Phthalic anhydride | 32.7 |
| Ethylene glycol | 16.0 |
| Adipic acid | 37.7 |

Example 2

| | Per cent by weight |
|---|---|
| Compound containing plastic polymers of chloroprene | 15.0 |
| Benzol | 21.0 |
| Alkyd resin | 56.0 |
| Rubber cement | 7.0 |
| Sulphur | 1.0 |

The compound containing plastic polymers of chloroprene and alkyd resin may be the same as described in Example 1. The rubber cement is added here to improve spreading and may consist of 94% naphtha (B. Pt. 68° C.) and 6% Ceylon rubber.

Example 3

| | Per cent by weight |
|---|---|
| Compound containing plastic polymers of chloroprene | 12.0 |
| Benzol | 55.5 |
| Alkyd resin | 32.2 |
| Red iron oxide | 0.3 |

The compound containing plastic polymers of chloroprene may consist of the following ingredients:

| | Per cent by weight |
|---|---|
| Plastic polymers of chloroprene | 73.0 |
| Magnesium oxide | 11.0 |
| Sulphur | 0.7 |
| Rosin | 3.7 |
| Cotton seed oil | 3.7 |
| Zinc oxide | 7.9 |

The alkyd resin which is carried to the C-stage may be prepared from the following:

| | Per cent by weight |
|---|---|
| Glycerine | 16.0 |
| Phthalic anhydride | 38.7 |
| Ethylene glycol | 13.5 |
| Adipic acid | 31.8 |

Example 4

| | Per cent by weight |
|---|---|
| Compound containing plastic polymers of chloroprene | 15.3 |
| Benzol | 61.5 |
| Alkyd resin | 23.0 |
| Red iron oxide | 0.2 |

The compound containing plastic polymers of chloroprene and alkyd resin may be the same as described in Example 3.

Example 5

| | Per cent by weight |
|---|---|
| Compound containing plastic polymers of chloroprene | 10.0 |
| Alkyd resin | 89.0 |
| Flexible phenol-aldehyde resin | 1.0 |

The flexible phenol-aldehyde resin may be of the oil-modified type described, for example, in Byck Patent No. 1,590,079.

The compound containing plastic polymers of chloroprene may consist of the following ingredients:

| | Per cent by weight |
|---|---|
| Plastic polymers of chloroprene | 60.3 |
| Litharge | 12.0 |
| Sulphur | 0.6 |
| Rosin | 3.2 |
| Anti-oxidant (Neozone D) | 1.2 |
| Zinc oxide | 6.0 |
| Cumar resin | 8.3 |
| Medium mineral oil | 8.3 |

The alkyd resin which is carried to the C-stage may be prepared from the following:

| | Per cent by weight |
|---|---|
| Glycerine | 4.91 |
| Phthalic anhydride | 11.84 |
| Ethylene glycol | 24.83 |
| Adipic acid | 58.42 |

As an example of the preparation of an alkyd resin for use in making the alkyd resin-polychloroprene composition in accordance with the present invention the following is given:

A polyhydric alcohol, such as glycerine, a polybasic acid such as phthalic anhydride, a dihydric alcohol such as ethylene glycol, and a dibasic aliphatic acid such as adipic acid, are reacted together to form a resin in accordance with the procedure set forth in Kienle and Rohlfs Patent 1,897,260. The ratio of glycol adipate to glycerol phthalate is chosen in accordance with the characteristics desired in the final resin. The ratio of proportions may be 2½:1, 3½:1, 6:1, or even as high as 15:1.

The compositions described in Examples 1, 2, 3 and 4 are particularly adapted for use as coating material for printers' blankets. The composition described in Example 5 is particularly adapted for use as coating material for printers' matrices and for printers' rolls.

Referring now to a description of some applications of the compositions of my invention, Fig. 1 shows a standard spreading machine for making printers' blankets. The machine comprises a framework 10 which includes a table upon which a scraping knife 11 is attached. The knife may be lowered or raised above the surface of the table by appropriate means shown at 12 and is so arranged that the edge of the knife is at all times parallel with the surface of the table.

The alkyd resin-polychloroprene composition 13, prepared in accordance with Method I described above, is placed back of the knife on very light rubber covered canvas 14. The rubber covered canvas is unwound from roll 15 with the rubber surface exposed and runs under the knife at a constant speed, receiving a light coating of alkyd resin-polychloroprene composition as it goes under the scraping blade. The thickness of the layer at one spreading is determined by the distance between the knife and the moving canvas and the speed at which the canvas runs under the knife.

After the canvas has received the coating it passes over a long hot plate 16 where the solvent or swelling agent is evaporated. The process is repeated until the desired thickness is obtained. It is preferred to spread thin individual coatings as the application of one thick layer tends to give an inaccurate and non-uniform coating.

After the desired thickness has been built up, the coated canvas is wound on a drum 17, driven by any suitable source of power (not shown) between alternate layers of heavy, smooth, waterproof paper 18 which is supplied from roll 19. External pressure is added to the drum or roll 17 by applying tape and canvas wrapping. The alternate layers of heavy paper and the outside wrapping lends added smoothness to the blanket during the curing or vulcanizing process. The tape and canvas wrapping may be dispensed with when the roll is cured in dry heat under air pressure.

Fig. 2 shows the roll 17 of printers' blanket removed from the machine shown in Fig. 1. Fig. 3 shows the tape and canvas wrapped roll 17 in oven 20 ready for curing or vulcanizing in dry heat. The temperature and time necessary for the heat treatment are dependent on the particular composition and on the thickness of the alkyd resin-polychloroprene composition to be cured. Fig. 4 shows a portion of the finished cured printers' blanket consisting of canvas 21, rubber 22 and alkyd resin-polychloroprene composition 23.

Fig. 5 shows an embossed printer's matrix composed of alkyd resin-polychloroprene composition 23. The matrix sheet may be prepared in accordance with Method II described above. The sheet after coming from the rollers is placed in a mold and subjected to pressure of about 100 to 500 lbs. per square inch and temperature of about 125° to 150° C. for about 10 to 60 minutes. The optimum pressure, temperature and time are dependent on the particular alkyd resin-polychloroprene composition employed and also on the thickness of sheet to be cured. The raised letters or type 24 (Fig. 6) are formed by pressing in a mold in the usual manner well known in the art.

The matrix shown in Fig. 6 is provided with an appropriate backing 25 which tends to strengthen the matrix and keep it from stretching out of shape. The backing may consist, for example, of duck or canvas.

The printers' roll shown in Fig. 7 may be constructed by applying on any suitable core or mandrel 26 a thin coating base of hard rubber or suitable cement 27. The core or mandrel may be of any suitable material, for example, steel. On this core, over the hard rubber or cement layer, is applied a coating of soft rubber 28. The thin coating base of hard rubber or cement is employed because the soft rubber coating will not adhere satisfactorily to the steel. The rubber coatings are applied to the mandrel and cured or vulcanized in accordance with the usual rubber roller technique. The rubber after curing should be able to withstand an additional cure without appreciable deterioration or hardening.

Alkyd resin-polychloroprene composition 29, prepared in accordance with Method II described above, is next tightly wrapped in sheet form over the rubber base and the ends thereof. The ends being wound from the mandrel up to the surface of the rubber base. It is preferred to use sheets about $\frac{1}{16}$ inch thick and to apply sufficient wrapping so that the final roll will have an alkyd resin-polychloroprene coating about $\frac{1}{4}$ inch thick. The rollers are built up to about $\frac{1}{8}$ inch or more in diameter over the size desired to allow for finishing.

Three or four oversize paper washers 30 are next slipped over the ends of the mandrel. The washers are folded neatly over the surface of the roller and held on the roller surface by means of several layers of paper 31. End plates 32 and 32' are now attached to the ends of the mandrel and secured by means of hollow head set screws 33 and 33'. The roller is tightly bound over the surface of the snugly wound paper with suitable tape 34. Open weave tape, 2 inches wide, wound with a $\frac{1}{2}$ inch overlap, has been found satisfactory.

The roll is then cured or vulcanized by dry heat in an air-ventilated oven. Assuming that the roller has an alkyd resin-polychloroprene coating $\frac{1}{4}$ inch in thickness, a heat treatment for about 1 to 5 hours at a temperature of approximately 150° C. has been found to give a satisfactory cure. The correct time of curing will depend upon the particular composition employed and upon the wall thickness desired and can be determined easily by experiment in each case. If desired the rubber coating on the mandrel may be cured or vulcanized simultaneously with the alkyd resin-polychloroprene composition.

The rollers should be allowed to cool to room temperature before the tape and paper are removed. The tape may be saved and used over again several times before it is unfit for further use. The cured roller is placed upon an arbor and locked in place. It is ground dry preferably with a medium 40 mesh wheel at a peripheral speed of about 3600 ft. per minute. The roller is then polished on a high speed lathe, using talcum powder and No. 2 emery paper. Extreme caution should be used at all times to keep the roller free from foreign particles and dirt, particularly when the roller is being wound before a cure.

The printing blankets, printing matrices and printing rolls having a coating surface of alkyd resin-polychloroprene composition are not subject to deterioration and distortion caused by oil absorption from the ink and thus give accurate printing. By controlling the kind and amount of alkyd resin to be used in the alkyd resin-polychloroprene composition the desired resiliency for various applications is easily obtainable.

While I have illustrated my invention with certain specific examples, it is to be understood that my invention is not limited thereto. All modifications coming within the true spirit and scope of my invention are meant to be covered by the appended claims.

What I claim as new and desire to secure by Letters Patent of the United States is:

1. A method of making an oil-resistant composition of matter which comprises milling cured alkyd resin on mixing rolls until a strong sheet is formed, milling plastic polymers of chloroprene until broken down, adding the milled alkyd resin sheet to the milled plastic polymers of chloroprene, subjecting the mass to further milling, and heat curing the composition.

2. The flexible, rubber-like, oil-resistant product produced by the method of claim 1.

3. A method of making an oil-resistant composition of matter which comprises milling cured alkyd resin, which is the product of reaction of glycerine, phthalic anhydride, glycol and dibasic aliphatic carboxylic acid, on mixing rolls until a strong sheet is formed, milling plastic polymers of chloroprene until broken down, adding the milled alkyd resin sheet to the milled plastic polymers of choloroprene, subjecting the mass to further milling, and heat curing the composition.

4. The flexible, rubber-like, oil-resistant product produced by the method of claim 3.

MOYER M. SAFFORD.